United States Patent [19]

Kayanoki

[11] Patent Number: 5,654,090
[45] Date of Patent: Aug. 5, 1997

[54] COATING COMPOSITION CAPABLE OF YIELDING A CURED PRODUCT HAVING A HIGH REFRACTIVE INDEX AND COATED ARTICLES OBTAINED THEREFROM

[75] Inventor: Hisayuki Kayanoki, Ichihara, Japan

[73] Assignee: Nippon Arc Co., Ltd., Chiba, Japan

[21] Appl. No.: 405,595

[22] Filed: Mar. 17, 1995

[30] Foreign Application Priority Data

Apr. 8, 1994 [JP] Japan ................... 6-071173

[51] Int. Cl.$^6$ .................... B32B 5/16; C08J 7/04
[52] U.S. Cl. .................... 428/329; 351/166; 428/331; 428/412; 428/447; 428/448
[58] Field of Search ................ 351/166; 428/323, 428/328, 329, 331, 412, 689, 697, 447, 448

[56] References Cited

U.S. PATENT DOCUMENTS 4,611,892  9/1986  Kawashima et al. .................. 351/159

FOREIGN PATENT DOCUMENTS 60-221701  11/1985  Japan .
5-2102      1/1993   Japan .
5-164902    6/1993   Japan .

*Primary Examiner*—D. S. Nakarani
*Attorney, Agent, or Firm*—Flynn, Thiel, Boutell & Tanis, P.C.

[57] ABSTRACT

A coating composition capable of yielding a cured product having a high refractive index comprises fine particles of at least one oxide selected from the group consisting of iron oxide, titanium oxide, cerium oxide, zirconium oxide, antimony oxide, zinc oxide and tin oxide, and composite oxides thereof, an epoxy group-containing silicon compound or a partial hydrolyzate thereof, and an organic compound having one OH group or SH group in the molecule and containing in the main chain thereof at least one bonding unit selected from the group consisting of —O—, —CO—O—, —S—, —CO—S— and —CS—S— along with at least one unsaturated group, the organic compound being soluble in water or a lower alcohol having up to 4 carbon atoms. When cured on a high refractive index substrate, the composition yields a cured product which has a very high hardness and is able to be deep dyed while suppressing development of interference fringes. Coated articles including coated plastic lenses having the cured film of the composition are also provided.

5 Claims, No Drawings

5,654,090

COATING COMPOSITION CAPABLE OF YIELDING A CURED PRODUCT HAVING A HIGH REFRACTIVE INDEX AND COATED ARTICLES OBTAINED THEREFROM

BACKGROUND OF THE INVENTION

1. Field of the Invention

This invention relates to a coating composition which is capable of yielding a hard coating film having a high refractive index and a very high hardness. The invention also relates to coated articles obtained by coating and cuing the composition on appropriate substrates.

2. Description of the Prior Art

Plastic lenses, which are a kind of transparent shaped article, are better in safety, ease of processability, fashionability and lightness than glass lenses. Recent developments of hard coat techniques and reflection inhibiting techniques for the lenses have expedited the rapid spread of the lenses. The silica-based hard coat film which is applied to plastic lenses has attracted attention due to its high hardness and high scratch resistance. Nevertheless, as plastic lenses having a high refractive index have been developed and start to be in wide spread use, there appears a phenomenon where interference fringes are developed owing to the great difference in refractive index and also in thickness between the hard coat film and the plastic lens substrate.

Using, in place of silica, high refractive index metal oxides such as antimony oxide, zirconium oxide, titanium oxide, tin oxide and the like, attempts and developments have been made to form high refractive index coating films on plastic lenses and other transparent moldings or shaped articles.

For instance, Japanese Patent Publication No. 63-37142 discloses a hard coating film comprised of antimony oxide and an epoxysilane, and Japanese Laid-open Patent Application No. 5-2102 discloses a hard coating film comprised of fine particles of titanium oxide, iron oxide and silicon dioxide and an epoxysilane. Moreover, Japanese Laid-open Patent Application. No. 5-164902 discloses a hard coating film which is made of fine particles of titanium oxide, cerium oxide and silicon oxide, an epoxysilane and a tetrafunctional silane compound.

However, the existing high refractive index hard coating films on transparent substrates have been able to undergo little dyeing after coating or may be dyed in a slight degree but cannot be subjected to deep color dyeing. For deep color dyeing, it is necessary to lower the hardness of the hard coating film.

SUMMARY OF THE INVENTION

It is an object of the invention to provide a coating composition which can suppress interference fringes from being developed after being applied to substrates having a high refractive index.

It is another object of the invention to provide a coating composition which can be dyed, especially in a deep color, after coating and has a high hardness when cured.

It is a further object of the invention to provide a coating composition which is capable of yielding an optically transparent, cured film.

It is a still further object of the invention to provide a coated article obtained by coating a coating composition of the above-mentioned type on appropriate substrates, such as a plastic lenses.

The above objects can be achieved, according to one embodiment of the invention, by a coating composition capable of yielding a cured product having a high refractive index which comprises:

(1) fine particles of at least one oxide selected from the group consisting of silica iron oxide, titanium oxide, cerium oxide, zirconium oxide, antimony oxide, zinc oxide and tin oxide, and composite oxides thereof;

(2) an epoxy group-containing silicon compound or a partial hydrolyzate thereof; and (3) an organic compound having one OH group or SH group in the molecule and containing in the main chain thereof at least one bonding unit selected from the group consisting of —O—, —CO—O—, —S—, —CO—S— and —CS—S— along with at least one unsaturated group, the organic compound being soluble in water or a lower alcohol having up to 4 carbon atoms.

According to another embodiment of the invention, there is also provided a coated article obtained by applying a coating composition of the type set forth above onto a high refractive index substrate and curing the applied composition.

DETAILED DESCRIPTION OF THE INVENTION (1) The first component in the composition of the invention consists of fine particles of a type defined above in the form of a sol obtained by dispersing the fine particles in a dispersion medium or a mixture of the sols. Preferably, the fine particles should be made of at least two oxides, or composite oxides thereof with silicon dioxide chemically or physically bonded therewith. Of course, these fine particles are dispersed in an appropriate dispersion medium. The fine particles of the composite metal oxides are used to improve the properties of fine particles of individual metal oxides.

The fine particles of the composite oxides containing titanium oxide may include, for example, particles of composite oxides made of titanium oxide, iron oxides, silicon dioxide or particles of composite oxides made of titanium oxide, cerium oxide and silicon dioxide. It is known that fine particles of titanium oxide are relatively poor in weatherability. It has been reported that when formed as a film, titanium oxide has a problem with weatherability. Since iron oxide or cerium oxide has an absorption wavelength region longer than titanium oxide, the weatherability is improved. It has been accepted that silicon dioxide serves to stabilize the fine particles of the composite oxide.

For instance, where the composite oxide containing $TiO_2$ consists of iron oxide, titanium oxide and silica, a ratio by weight of $Fe_2O_3$ and $TiO_2$ should preferably be within a range of 0.005 to 1.0:1, wherein the iron oxide is calculated as $Fe_2O_3$, the titanium oxide as $TiO_2$ and the silica as $SiO_2$. When the ratio is not less than 0.005, the weatherability of the resultant film is significantly improved. However, if the ratio exceeds 1.0, the resultant film undergoes yellowing with a lowering in transparency.

Moreover, the ratio by weight of $SiO_2$ and $(Fe_2O_3+TiO_2)$ should preferably be within a range of 0.001 to 1:1. When the weight ratio is not less than 0.001, the dispersion stability of the sol is improved. When the weight ratio exceeds 1.0, the effect of increasing the refractive index is reduced.

Alternatively, when the composite metal oxides are made, for example, of cerium oxide, titanium oxide and silica, it is preferred that when the cerium oxide is calculated as $CeO_2$, titanium oxide as $TiO_2$ and silica as $SiO_2$, the ratio by weight of $CeO_2$ ad $TiO_2$ is within a range of 0.1 to 1.0:1 and the ratio by weight of $SiO_2$ and $(CeO_2+TiO_2)$ is within a range of 0.05 to 0.5:1. If the weight ratio of $CeO_2$ and $TiO_2$ is not less than 0.1, the weatherability of the resultant film is improved in weatherability. However, when the ratio exceeds 1.0, the film suffers an increasing degree of yellowing. Moreover, if the weight ratio of $SiO_2$ and ($CeO_2$+ $TiO_2$) is not less than 0.05, the dispersion stability of the resultant sol is improved. If the ratio exceeds 0.5, the dispersion stability of $CeO_2$ and $TiO_2$ undesirably lowers.

The oxides, and mixtures and composite oxides thereof should preferably be in the form of fine particles having an average particle size of from 1 to 100 nm. Particles having an average size smaller than 1 nm cannot be manufactured in practice. On the other hand, the particles having an average size exceeding 100 nm will result in a lowering in transparency of the resultant film.

The oxides and mixtures and composite oxides thereof may be subjected to surface modification with organosilicon compounds. The surface-modified particles are improved in reactivity with and affinity for the matrix resin and also in affinity for solvents or dispersion mediums.

The organosilicon compounds used for the above purpose include, for example, monofunctional silanes of the formula, $R_3SiX$, wherein each R represents an organic group having an alkyl group, a phenyl group, a vinyl group, a methacryloxy group, a mercapto group, an amino group or an epoxy group, and X represents a hydrolyzable group. Specific examples include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, γ-acryloxypropyldimethylmethoxysilane, γ-methacryloxypropyldimethylmethoxysilane, γ-mercaptopropyldimethylmethoxysilane, γ-mercaptopropyldimethylethoxysilane, N-β-(aminoethyl)-γ-aminopropyldimethylmethoxysilane, γ-aminopropyldimethylmethoxysilane, γ-aminopropyldimethylethoxysilane, γ-glycidoxypropyldimethylmethoxysilane, γ-glycidoxypropyldimethoxyethoxysilane, β-(3,4-epoxycyclohexyl)ethyldimethylmethoxysilane, and the like.

Alternatively, there may be used bifunctional silanes of the formula, $R_2SiX_2$, wherein each R and each X have, respectively, the same meanings as defined above. Specific examples include dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, -methacryloxypropyldimethyldimethoxysilane, γ-acryloxypropylmethyldimethoxysilane, γ-mercaptopropylmethyldimethoxysilane, γ-mercaptopropylmethyldiethoxysilane, N-β-(aminoethyl)-γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethyldiethoxysilane, β-(3,4-epoxycyclohexyl)ethylmethyldimethoxysilane, and the like.

Still alternatively, there may be used trifunctional silanes of the formula, $RSiX_3$, wherein each R and each X have, respectively, the same meanings as defined above. Specific examples include methyltrimethoxysilane, ethyltrimethoxysilane, methyltriethoxysilane, ethyltriethoxysilane, phenyltrimethoxysilane, phenyltriethoxysilane, vinyltrimethoxysilane, vinyltriethoxysilane, vinyl(β-methoxyethoxy)silane, γ-acryloxypropyltrimethoxysilane, γ-methacryloxypropyltrimethoxysilane, γ-mercaptopropyltrimethoxysilane, γ-mercaptopropyltriethoxysilane, N-β(aminoethyl)-γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, β-glycidoxypropyltriethoxysilane, β-(3,4-epoxycyclohexyl)ethyltrimethoxysilane, and the like.

Alternatively, there may be used tetrafunctional silanes of the formula, $SiX_4$, wherein X has the same meaning as defined hereinabove. Specific examples include tetraethylorthosilicate, tetramethylorthosilicate and the like.

The surface modification of the first component with an organosilicon compound may be effected without hydrolysis of the hydrolyzable group or groups of the organosilicon compound or after hydrolysis of the group or groups.

The organosilicon compound is added in amounts which depend on the amount of the hydroxyl group present in the surface of the oxide or composite oxide. The amount is generally in the range of 0.01 to 0.15 times by weight of fine particles of the first component.

The dispersion medium for the first component may be water, hydrocarbons, halogenareal hydrocarbons, esters, ketones, alcohols, cellosolves (i.e. ethylene glycol monoalkyl ethers), amines, organic carboxylic acids and the like. These mediums may be used singly or in combination.

Examples of the medium include methanol, ethanol, isopropyl alcohol, n-butanol, 2-butanol, methyl cellosolve, (ethylene glycol monomethyl ether), ethyl cellosolve (ethylene glycol monoethyl ether), propyl cellosolve (ethylene glycol monopropyl ether), butyl cellosone (ethylene glycol monobutyl ether), ethylene glycol, methyl acetate, ethyl acetate, diethyl ether, tetrahydrofuran, acetone, xylene, N,N-dimethylformamide, methyl ethyl ketone, dichloroethane, toluene and the like.

The dispersion sol of the first component may be commercially available under the designations of Optolake 1130 F-2 (A-8) from Catalysts & Chemicals Co., Ltd. of Japan (iron oxide-titanium oxide-silica composite particles having a size of 10 nm and compositional ratios of $TiO_2$, $Fe_2O_3$ and $SiO_2$ of 80:0.7:19.3, solid content of 30%, dispersion in methanol) and the like.

The fine particles of the first component are used to increase a refractive index of a coating film. It is known that when the refractive index of the film is within a range of ±0.03, preferably ±0.020, of that of a substrate to be coated, the interference fringes can be suppressed from development. In other words, the amount of the fine particle sol should be properly controlled depending on the refractive index of a transparent substrate to be coated. The amount of the fine particle sol may also be limited in view of an improvement in other film characteristics.

The fine particles of the first component are used in an amount of 10 to 70 wt %, preferably from 15 to 60 wt %, based on the total solids in the coating compositions. If the amount is less than 10 wt % of the total solids, the refractive index cannot significantly increase. Over 70 wt%, the resultant film may suffer cracking.

(2) The epoxy group-containing silicon compound or its partial hydrolyzate used as the second component in the composition of the invention is one which is of the following general formula (A), or a partial hydrolyzate thereof $$R^1R^2_a Si(OR^3)_{3-a} \quad (A)$$

wherein $R^1$ represents an epoxy group-containing group having from 2 to 12 carbon atoms, $R^2$ represents an alkyl group having from 1 to 6 carbon atoms, an aryl group, an alkenyl group having from 1 to 6 carbon atoms, a halogenated alkyl group having from 1 to 6 carbon atoms, and a halogenated aryl group, $R^3$ represents a hydrogen atom or an alkyl, an acyl group or an alkylacyl group each having from 1 to 4 carbon atoms, and a is a value of 0, 1 or 2.

Examples of the epoxy group-containing silicon compound of the general formula (A) include γ-glycidoxypropyltrimethoxysilane, β-glycidoxypropyltrimethoxysilane, γ-glycidoxypropyltriethoxysilane, β-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, γ-(β-glycidoxyethoxy)propyltrimethoxysilane, β-(3,4-epoxycyclohexyl)ethyltriethoxysilane, γ-glycidoxypropylphenyldimethoxysilane, γ-glycidoxypropylphenyldiethoxysilane, and the like.

The second component of the invention is used in an amount of from 5 to 90 wt %, preferably from 10 to 85 wt %, based on the total solids in the coating composition. If the amount is less than 5 wt % of the total solids, the dyeing properties of the film lower. On the other hand, when the amount exceeds 90 wt %, the amount of the fine particle sol is correspondingly reduced, with the refractive index not increasing as desired.

(3) The third component of the invention should be a compound which has one OH group or SH group in the molecule and has in the main chain of the molecule at least one functional group selected from —O—, —CO—O—, —S—, —CO—S— and —CS—S— and which is soluble in water or a lower alcohol having up to 4 carbon atoms. The compound is of the following general formula (B)

$$R^4—X—R^5YH \quad (B)$$

wherein $R^4$ represents a monovalent hydrocarbon group having at least one unsaturated group which may contain an oxygen atom or a sulfur atom, $R^5$ represents a divalent hydrocarbon group having 2 or more carbon atoms which may contain an oxygen atom or a sulfur atom, X represents —O—, —CO—O—, —S—, —CO—S— and —CS—S—, and Y represents an oxygen atom or a sulfur atom.

Examples of the compound of the formula (B) include polyethylene glycol monomethacrylate, poly(butanediol) monoacrylate, poly(butanediol) monomethacrylate, 1,4-butanediol monovinyl ether, 1,6-hexanedithiol monoacrylate, di(acryloxyethyl)hydroxyethylamine, 2-hydroxy-3-phenoxypropyl acrylate, pentaerythritol triacrylate, 2-hydroxybutyl acrylate, 3-acryloyloxy glycerine monmethacrylate, 2-hydroxy-1,3-dimethacryloxypropane and the like.

Preferred compounds of the third component of the invention are those compounds of the following general formulas (C) to (F)

$$\begin{array}{c} R^6 \\ | \\ CH_2=C—C—(OR^7)_c—OH \\ \| \\ O \end{array} \quad (C)$$

wherein $R^6$ represents a hydrogen atom or a methyl group, $R^7$ represents —$CH_2CH(R^8)$— wherein $R^8$ represents H or $CH_3$, and c is an integer of 2 to 4.

Specific examples of the compound of the formula (C) include diethylene glycol monoacrylate, tetraethylene glycol monoacrylate, polyethylene glycol monoacrylate, tripropylene glycol monoacrylate, polypropylene glycol monoacrylate, diethylene glycol monomethacrylate, tetraethylene glycol monomethacrylate, polyethylene glycol monomethacrylate, tripropylene glycol monomethacrylate, polypropylene glycol monomethacrylate and the like.

The general formula (D) is shown below $$\begin{array}{c} R^6 \\ | \\ CH_2=C—C—O—(CH_2)_b—OH \\ \| \\ O \end{array} \quad (D)$$

wherein $R^6$ represents a hydrogen atom or a methyl group, and b is an integer of from 2 to 10, preferably from 4 to 6.

Specific examples of the compound of the formula (D) include 4-hydroxybutyl acrylate, 4-hydroxybutyl methacrylate, 4-hydroxyethyl acrylate, 4-hydroxyethyl methacrylate and the like.

The general formula (E) is shown below $$CH_2=CH—(CH_2)_d—O—(CH_2)_e—OH \quad (E)$$

wherein d is a value of 0 or 1 and e is an integer of from 4 to 120. The compounds of the general formula (E) include, for example, 4-hydroxybutyl allyl ether, 4-hydroxybutyl vinyl ether and the like.

The general formula (F) is as follows $$CH_2=CH—(CH_2)_d—(OR^7)_f—OH \quad (F)$$

wherein $R^7$ represents —$CH_2CH_2$— or —$CH_2CH(CH_3)$—, d is a value of 0 or 1, and f is an integer of from 2 to 9. The compounds of the general formula (F) include, for example, diethylene glycol monoallyl ether, triethylene glycol monovinyl ether and the like.

The third component is used in an amount of from 1 to 45 wt %, preferably from 2 to 30 wt %, based on the total solids in the coating composition. If the amount of this third component is less than 1 wt % in the composition, deep color dyeing is not possible. On the other hand, when the amount exceeds 45 wt %, the resultant film lowers in hardness.

(4) The coating composition of the invention may further comprise, aside from the first to third components, an organic silicon compound of the following general formula (G) or its partial hydrolyzate as a fourth component $$R^6_h R^2_a Si(OR^3)_{4-h-a} \quad (G)$$

wherein $R^2$ and $R^3$ have, respectively, the same meanings as defined with respect to the general formula (A), $R^6$ represents an alkyl group or halogenated alkyl group having from 1 to 4 carbon atoms, or an aryl group or halogenated aryl group having from 6 to 12 carbon atoms, a methacryloxyalkyl group having from 5 to 8 carbon atoms, or a ureidoalkylene group, aromatic ureidoalkylene group, halogenated aromatic alkylene group or mercaptoalkylene group each having from 2 to 10 carbon atoms, a is a value of 0, 1 or 2, and h is a value of 0, 1, 2 or 3.

The addition of the compound of the general formula (G) results in a coating film which is improved in adhesion to a reflection inhibiting film which will be formed on the coating film, and also in an increase of hardness. In addition, the refractive index of the coating film may be appropriately controlled by controlling the amount of the compound of the formula (G).

Specific examples of the organosilicon compound include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, vinyl(β-methoxyethoxy)silane, γ-acryloxypropyldimethylmethoxysilane, γ-methacryloxypropyldimethylmethoxysilane, γ-mercaptopropyldimethylmethoxysilane, γ-mercaptopropyldimethylethoxysilane, N-β-(aminoethyl)-γ-aminopropyldiemthylmethoxysilane, γ-aminopropyldimethylmethoxysilane, γ-aminopropyldimethylethoxysilane, γ-glycidoxypropyldimethylmethoxysilane, γ-glycidoxypropyldimethoxyethoxysilane, β-(3,4-epoxycyclohexyl)ethyldimethylmethoxysilane, dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropyldimethyldimethoxysilane, γ-mercaptopropylmethyldimethoxysilane, γ-mercaptopropylmethyldiethoxysilane, N-β-(aminoethyl)-γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethoxydiethoxysilane, β-(3,4-epoxycyclohexyl)ethylmethyldimethoxysilane, methyltrimethoxysilane, ethyltrimethoxysilane, methyltriethoxysilane, ethyltriethoxysilane, phenyltrimethoxysilane, phenyltriethoxysilane, vinyltrimethoxysilane, vinyltriethoxysilane, vinyl(β-methoxyethoxy)silane, γ-acryloxypropyltrimethoxysilane, γ-methacryloxypropyltrimethoxysilane, γ-mercaptopropyltrimethoxysilane, γ-mercaptopropyltriethoxysilane, N-β-(aminoethyl)-γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, β-glycidoxypropyltriethoxysilane, β-(3,4-epoxycyclohexyl)ethyltrimethoxysilane, tetraethylorthosilicate, tetramethylorthosilicate, and the like.

The fourth component is added to the coating composition in an amount of 0 to 60 wt %, preferably from 2 to 45 wt %, based on the total solids in the coating composition. When the fourth component is used in an amount exceeding 60 wt % of the total solids, it becomes difficult to attain as high refractive index as desired.

(5) The coating composition of the invention should preferably comprise a curing catalyst for the coating composition. Such catalysts include, for example, alkali metal salts and ammonium salts of carboxylic acids such as sodium acetate, ammonium acetate and the like, metal salts and ammonium salts of acetylacetone such as acetylacetone alminium, acetylacetone zirconium salt, acetylacetone ammonium salt and the like, primary to tertiary amines such as butylamine, hydroxyethylamine, dimethylamine, diethylamine, trimethylamine, triethylamine, dimethylphenylamine, polyalkyleneamines and the like, metal salts and ammonium salts of perchloric acid such as magnesium perchlorate, ammonium perchlorate and the like, metal salts of ethylacetoacetate, metal salts coordinated with acetylacetone and ethyl acetoacetate, organometal salts such as zinc napthenate, tin octylate and the like, and Lewis acids such as $SnCl_4$, $TiCl_4$, $ZnCl_2$ and the like.

The above-mentioned compound may be used in combination with organic mercaptans or mercaptoalkylenesilanes as a curing catalyst for the coating composition of the invention. The curing catalyst may be added at the time of preparation of the composition or immediately before coating. Choice of the time when the curing catalyst is added may be optionally determined as desired.

The curing catalyst is generally added to the coating composition in an amount of from 0.001 to 10 wt % based on the total solids of the composition.

(6) The dispersion medium used in the coating composition of the invention may be alcohols, ethers, aromatic hydrocarbons, esters and ketones. Examples of the medium include methanol, ethanol, isopropyl alcohol, n-butanol, 2-butanol, methyl cellosolve, ethyl cellosolve, propyl cellosolve, butyl cellosolve, ethylene glycol, methyl acetate, ethyl acetate, diethyl ether, tetrahydrofuran, acetone, xylene, N,N-dimethylformamide, methyl ethyl ketone, dichloroethane, toluene and the like.

The dispersion medium is used in an amount of from 100 to 800 wt % based on the total solids of the composition. If the amount of the dispersion medium is less than 100 wt %, the thickness of the resultant film becomes great, with the tendency that it suffers cracking. On the contrary, when the amount exceeds 80 wt %, the resultant film tends to become thin, resulting in insufficient hardness. Needless to say, the dispersion medium may be used as a dispersion medium for the first component.

(7) In order to improve the fluidity of the coating composition at the time of coating, the coating composition of the invention may further comprise a leveling agent. Examples of the leveling agent include copolymers of polyoxyalkylenes and polydimethylsiloxanes, copolymers of polyoxyalkylenes and fluorocarbons and the like. The additive is added to the coating composition in an amount of 0.001 to 5 wt % of the total composition.

Besides, antioxidants, weathering stabilizers, colorants and/or antistatic agents may be added to the composition, if necessary.

The coating composition may be applied onto substrates by various methods including a dipping method, a flow-coating method, a spinning method, a spraying method and the like. The thus applied coating composition is thermally treated under conditions of 50° to 130° C. for 1 to 10 hours, which may vary depending on the heat resistance of a substrate being applied.

The hard coat film should preferably have a dry thickness of from 0.2 to 10 μm and should be preferably controlled to have a refractive index of from 1.48 to 1.70, although depending on the type of substrate and the purpose in end use. If the dry thickness of the hard coat film is less than 0.2 μm, the hardness of the film is insufficient. On the contrary, when the dry thickness exceeds 10.0 μm, the resultant film suffers cracking.

(8) The substrate to which the coating composition is applied should be made of resins whose refractive index is not smaller than 1.50 and may be in the form of plastic lenses for glasses, optic members including glass articles, sheets, moldings and the like.

Transparent substrates having a refractive index not smaller than 1.50 include, for examples, those made of polycarbonates which have a refractive index of 1.50. Moreover, a number of resins have been proposed in many patent publications and laid-open applications for use as plastic lenses for glasses, including those lenses made of polyurethane resins, methacrylic polymers, acrylic polymers and combinations thereof. For instance, lenses made of urethane resins are ones which are obtained by thermally curing monomers MR-6, modified MR-6 and MR-7 (commercially available from Mitsui Toatsu Chemicals Inc.). Lenses made of methacrylic polymers are those obtained by radical polymerization of TS-26 monomer commercially available from Tokuyama Co., Ltd.). Likewise, lenses obtained by use of urethane reaction and vinyl polymerization are those obtained by polymerizing ML-3 monomer (commercially available from Mitsubishi Gas Chemical Co., Inc.).

(9) Reflection inhibiting film

By provision of a single-layer or multilayer reflection inhibiting film made of an inorganic material on a hard coat film, the reflection can be reduced with an improved optical transmittance and also with an improved weatherability.

Examples of the inorganic material include $SiO$, $SiO_2$, $Si_3N_4$, $TiO_2$, $ZrO_2$, $Al_2O_3$, $MgF_2$, $Ta_2O_5$ and the like. These materials are subjected to vacuum deposition to form a thin film on a substrate.

In order to improve the adherence of the hard coat film, lens or other substrates should preferably be subjected to pretreatments such as an alkali treatment, an acid treatment, a plasma treatment, a corona treatment, a flame treatment and the like.

The film obtained by applying a coating composition of the invention onto a high refractive index substrate and curing has very high scratch and abrasion resistances and is able to suppress interference fringes from development. In addition, the film may be dyed to a deep color. This is because the third component reacts with the condensate of an organosilicon compound so that the OR groups of the third component are locally pendant from the condensate, thereby ensuring the trapping of a dye or passage channels for the dye. This results not only in very high scratch and abrasion resistances, but also in the possibility of deep color dyeing.

In contrast, known coating compositions usually make use of dyeable organic components as a crosslinking agent. The resultant film relatively lowers in strength in comparison with a film of an organosilicon compound as in the present invention.

The present invention is more particularly described by way of examples and the invention is not limited to these examples.

EXAMPLE 1

303 g of a composite metal oxide sol made of $TiO_2$—$Fe_2O_3$—$SiO_2$ (having a solid content of 30% in the form of a dispersion sol in methanol commercially available under the designation of Optolake 1130 F-2(A-8) from Chatalyst & Chemical Co., Ltd.) was weighed and placed in a flask. 170 g of distilled water was added to the sol under agitation, followed by the gradual addition of 191 g of γ-glycidoxypropyltrimethoxysilane and 69 g of methyltrimethoxysilane. After completion of the addition, the mixture was agitated for a further 2 hours.

Thereafter, while the mixed dispersion was agitated, 220 g of isopropyl alcohol was added, followed by the further addition of 40 g of polyethylene glycol monomethacrylate of the afore-indicated general formula (C) wherein $R^6$=methyl group, $R^7$=$CH_2CH_2$ and c=4 (commercially available under the designation of Blenmor PE-200 from Nippon Oil and Fats CO., Ltd.). Further, 3 g of ammonium perchlorate used as a curing catalyst and 0.4 g of a silicone surface active agent (commercially available under the designation of L-7001 from Nippon Unicar Co., Ltd.) used as a flow control agent were added, followed by agitation for 1 hour. The resultant mixture was aged at room temperature for 48 hours.

The mixture was applied onto a plastic lens (a lens obtained by thermally polymerizing a monomer commercially available under the designation of MR-6 from Mitsui Toatsu Chemicals, Inc.) having a refractive index of 1.594 and made of a urethane resin, followed by thermally curing at 120° C. for 1 hour. The resultant film was colorless and transparent in appearance. The adherence was evaluated as 100/100 when determined by a cross-hatch test. The cured film had a refractive index of 1.58 and was substantially inconspicuous with respect to the interference fringe. The film thickness was 1.5 to 2 μm with a SW hardness of 4. When the film was subjected to dyeing for 5 minutes, the transmittance was reduced to 32%.

EXAMPLE 2

The general procedure of Example 1 was repeated except that the composite metal oxide sol made of $TiO_2$—$Fe_2O_3$—$SiO_2$ was replaced by a composite metal oxide sol made of $TiO_2$—$CeO_2$—$SiO_2$ (having a solid content of 30% in the form of a dispersion sol in methanol commercially available under the designation of Optolake 1130A (A-8) from Chatalyst & Chemical Co., Ltd.). The results are shown in Table 1.

EXAMPLE 3

The general procedure of Example 1 was repeated except that the composite metal oxide sol made of $TiO_2$—$Fe_2O_3$—$SiO_2$ was replaced by a composite metal oxide sol made of $TiO_2$—$SiO_2$ (having a solid content of 30% in the form of a dispersion sol in methanol commercially available from Chatalyst & Chemical Co., Ltd., with a value of $TiO_2/SiO_2$= 85/15). The results are shown in Table 1.

EXAMPLE 4

455 g of a composite metal oxide sol made of $TiO_2$—$CeO_2$ (having a solid content of 20% in the form of a dispersion sol in methanol commercially available from Chatalyst & Chemical Co., Ltd., with a value of $TiO_2/CeO_2$= 8/2) was weighed and placed in a flask. 142 g of distilled water was added to the sol under agitation, followed by gradual addition of 191 g of γ-glycidoxypropyltrimethoxysilane and 69 g of methyltrimethoxysilane. After completion of the addition, the mixture was agitated for further 2 hours.

Thereafter, while the mixed dispersion was agitated, 100 g of isopropyl alcohol was added, followed by further addition of 40 g of Blenmor PE-200. Further, 3 g of ammonium perchlorate used as a curing catalyst and 0.4 g of L-7001 as a flow control agent were added, followed by agitation for 1 hour. The resultant mixture was aged at room temperature for 48 hours. The mixture was used for evaluation in the same manner as in Example 1. The results are shown in Table 1.

EXAMPLE 5

The general procedure of Example 1 was repeated except that the composite metal oxide sol made of $TiO_2$—$Fe_2O_3$—$SiO_2$ was replaced by a metal oxide sol made of $Sb_2O_5$ (having a solid content of 30% in the form of a dispersion sol in methanol commercially available under the designation of Sancolloid AMT-130 from Nissan Chemical Industries, Ltd.) The results are shown in Table 1.

EXAMPLE 6

467 g of a metal oxide sol made of $CeO_2$ (having a solid content of 15% in the form of an aqueous dispersion sol commercially available under the designation of Needral U-15 from Taki Chemical Co., Ltd.) was weighed and placed in a flask. 184 g of γ-glycidoxypropyltrimethoxysilane was gradually added to the sol and hydrolyzed. After completion of the addition, the mixture was agitated for further 1 hour.

Thereafter, while the mixed dispersion was agitated, 316 g of isopropyl alcohol was added, followed by the further addition of 30 g of Blenmor PE-200. Further, 3 g of ammonium perchlorate used as a curing catalyst and 0.4 g of L-7001 as a flow control agent were added, followed by agitation for 1 hour. The resultant mixture was aged at room temperature for 48 hours. The mixture was used for evaluation in the same manner as in Example 1. The results are shown in Table 1.

EXAMPLE 7

303 g of Optolake 1130F-2(A-8) was weighed and placed in a flask, to which 170 g of distilled water was added under agitation. 239 g of γ-glycidoxypropyltrimethoxysilane was gradually added to the mixture. After completion of the addition, the mixture was agitated for a further 2 hours.

Thereafter, while the mixed dispersion was agitated, 241 g of methanol was added, followed by further addition of 40 g of Blenmor PE200. Then, 15 g of a modified product of an acetylacetone metal salt (Acetope Al(MX) commercially available from Hope Pharmaceutical Co., Ltd.) used as a curing catalyst and 0.4 g of a silicone surface active agent used as a flow control agent (PA-32 commercially available from Dow-Coning of Asia) were added, followed by agitation for 1 hour. The resultant mixture was aged at room temperature for 48 hours.

The mixture was used for evaluation in the same manner as in Example 1. The results are shown in Table 1.

EXAMPLE 8

340 g of Optolake 1130F-2(A-8) was weighed and placed in a flask, to which 122 g of distilled water was added under agitation. 134 g of γ-glycidoxypropyltrimethoxysilane and 128 g of methyltrimethoxysilane were gradually added to the mixture. After completion of the addition, the mixture was agitated for further 2 hours.

Thereafter, while the mixed dispersion was agitated, 229 g of ethanol was added, followed by the further addition of 40 g of Blenmor PE200. Then, 3 g of ammonium perchlorate used as a curing catalyst and 0.4 g of L-7001 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 9

312 g of Optolake 1130F-2(A-8) was weighed and placed in a flask, to which 120 g of distilled water was added under agitation. 83 g of γ-glycidoxypropyltrimethoxysilane and 178 g of methyltrimethoxysilane were gradually added to the mixture. After completion of the addition, the mixture was agitated for a further 2 hours.

Thereafter, while the mixed dispersion was agitated, 234 g of ethanol was added, followed by the further addition of 60 g of Blenmor PE200. Then, 9 g of acetylacetone aluminium salt used as a curing catalyst and 0.4 g of a silicone surface active agent used as a flow control agent (PA-57 commercially available from Dow-Coning of Asia) were added, followed by agitation for 1 hour. The resultant mixture was aged at room temperature for 48 hours.

The mixture was used for evaluation in the same manner as in Example 1. The results are shown in Table 1.

EXAMPLE 10

310 g of Optolake 1130F-2(A-8) was weighed and placed in a flask, to which 120 g of distilled water was added under agitation. 189 g of γ-glycidoxypropyltrimethoxysilane, 34 g of methyltrimethoxysilane and 27 g of dimethyldimethoxysilane were gradually added to the mixture. After completion of the addition, the mixture was agitated for a further 2 hours.

Thereafter, while the mixed dispersion was agitated, 277 g of methanol Was added, followed by the further addition of 30 g of polyethylene glycol monomethacrylate of the afore-indicated formula (C) wherein $R^6$=methyl group, $R^7$=$CH_2CH_2$ and c=2 (commercially available under the designation of Blenmor PE90 from Nippon Oil and Fats Co., Ltd.). Then, 9 g of acetylacetone aluminium salt used as a curing catalyst and 0.4 g of L-7001 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 11

310 g of Optolake 1130F-2(A-8) was weighed and placed in a flask, to which 120 g of distilled water was added under agitation. 212 g of γ-glycidoxypropyltrimethoxysilane and 58 g of tetraethylorthosilicate were gradually added to the mixture. After completion of the addition, the mixture was agitated for further 2 hours.

Thereafter, while the mixed dispersion was agitated, 257 g of methanol was added, followed by the further addition of 3 g of Blenmor PE200. Then, 9 g of acetylacetone aluminium salt used as a curing catalyst and 0.4 g of PA-32 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 12

247 g of Optolake 1130F-2(A-8) was weighed and placed in a flask, to which 150 g of distilled water was added under agitation. 210 g of γ-glycidoxypropyltrimethoxysilane and 57 g of phenyltrimethoxysilane were gradually added to the mixture. After completion of the addition, the mixture was agitated for a further 2 hours.

Thereafter, while the mixed dispersion was agitated, 303 g of methanol was added, followed by the further addition of 20 g of Blenmor PE200. Then, 15 g of Acetope Al(MX) used as a curing catalyst and 0.4 g of L-7001 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 13

310 g of Optolake 1130F-2(A-8) was weighed and placed in a flask, to which 120 g of distilled water was added under agitation. 211 g of γ-glycidoxypropylmethyldimethoxysilane was gradually added to the mixture. After completion of the addition, the mixture was agitated for a further 2 hours.

Thereafter, while the mixed dispersion was agitated, 326 g of ethanol was added, followed by the further addition of 20 g of Blenmor PE90. Then, 9 g of acetylacetone aluminium salt used as a curing catalyst and 0.4 g of PA-57 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 14

310 g of Optolake 1130F-2(A-8) was weighed and placed in a flask, to which 120 g of distilled water was added under agitation. 169 g of γ-glycidoxypropylmethyldimethoxysilane and 68 g of methyltrimethoxysilane were gradually added to the mixture. After completion of the addition, the mixture was agitated for a further 2 hours.

Thereafter, while the mixed dispersion was agitated, 280 g of IPA (isopropyl alcohol) was added, followed by the further addition of 20 g of Blenmor PE200. Then, 3 g of ammonium perchlorate used as a curing catalyst and 0.4 g of PA-57 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 15

310 g of Optolake 1130F-2(A-8) was weighed and placed in a flask, to which 120 g of distilled water was added under agitation. 278 g of γ-glycidoxypropyltrimethoxysilane was gradually added to the mixture. After completion of the addition, the mixture was agitated for a further 2 hours.

Thereafter, while the mixed dispersion was agitated, 270 g of IPA was added, followed by the further addition of 8 g of Blenmor PE200. Then, 9 g of acetylacetone aluminium salt used as a curing catalyst and 0.4 g of PA-32 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 16

The general procedure of Example 1 was repeated except that the polyethylene glycol monomethacrylate of the afore-indicated general formula (C) wherein $R^6$=methyl group, $R^7$=$CH_2CH_2$ and c=4 was replaced by polypropylene glycol monomethacrylate of the formula (C) wherein $R^6$=methyl group, $R^7$=$CH_2CHCH_3CH_2CH_2$ and c=5 (commercially available under the designation of Blenmor PP1000 from Nippon Oil and Fats Co., Ltd.). The results are shown in Table 1.

EXAMPLE 17

310 g of Optolake 1130F-2(A-8) was weighed and placed in a flask, to which 120 g of distilled water was added under agitation. 179 g of γ-glycidoxypropyltrimethoxysilane was gradually added to the mixture. After completion of the addition, the mixture was agitated for a further 2 hours.

Thereafter, while the mixed dispersion was agitated, 280 g of IPA was added, followed by the further addition of 100 g of Blenmor PE90. Then, 9 g of acetylacetone aluminium salt used as a curing catalyst and 0.4 g of PA-32 as a flow control agent were added, followed by agitation for 1 hour. The resultant mixture was aged at room temperature for 48 hours.

The mixture was used for evaluation in the same manner as in Example 1. The results are shown in Table 1.

EXAMPLE 18

The general procedure of Example 1 was repeated except that the polyethylene glycol monomethacrylate of the afore-indicated general formula (C) wherein $R^6$=methyl group, $R^7$=$CH_2CH_2$ and c=4 was replaced by 4-hydroxybutyl acrylate of the afore-indicated general formula (D) wherein $R^6$=hydrogen atom and b=4 (commercially available under the designation of 4-HBA from Osaka Organic Chemical Ind. Ltd.). The results are shown in Table 1.

EXAMPLE 19

The general procedure of Example 1 was repeated except that the polyethylene glycol monomethacrylate of the afore-indicated general formula (C) wherein $R^6$=methyl group, $R^7$=$CH_2CH_2$ and c=4 was replaced by 4-hydroxybutyl vinyl ether of the afore-indicated general formula (E) wherein d=0 and b=4 (commercially available under the designation of Lapicure HBVE from I.S.P., Japan). The results are shown in Table 1.

EXAMPLE 20

The general procedure of Example 1 was repeated except that the polyethylene glycol monomethacrylate of the afore-indicated general formula (C) wherein $R^6$=methyl group, $R^7$=$CH_2CH_2$ and c=4 was replaced by ethylene glycol monoallyl ether of the afore-indicated general formula (E) wherein d=1 and b=2 (commercially available from Tokyo Chemical Ind. Co., Ltd.). The results are shown in Table 1.

EXAMPLE 21

The general procedure of Example 1 was repeated except that the polyethylene glycol monomethacrylate of the afore-indicated general formula (C) wherein $R^6$=methyl group, $R^7$=$CH_2CH_2$ and c=4 was replaced by an allylated polyether of the afore-indicated general formula (F) wherein d=1 and f=3 to 4 (commercially available under the designation of Uniox PKA-5001 from Nippon Oil and Fats Co., Ltd.). The results are shown in Table 1.

EXAMPLE 22

The general procedure of Example 1 was repeated except that the polyethylene glycol monomethacrylate of the afore-indicated general formula (C) wherein $R^6$=methyl group, $R^7$=$CH_2CH_2$ and c=4 was replaced by 2-hydroxy-3-phenoxypropyl acrylate (commercially available under the designation of NK Ester 702A from Shinnakamura Chem. Ind. Co., Ltd.). The results are shown in Table 1.

EXAMPLE 23

The general procedure of Example 1 was repeated except that the polyethylene glycol monomethacrylate of the afore-indicated general formula (C) wherein $R^6$=methyl group, $R^7$=$CH_2CH_2$ and c=4 was replaced by 2hydroxy-1,3-dimethacryloxypropane (commercially available under the designation of NK Ester 701 from Shinnakamura Chem. Ind. Co., Ltd.). The results are shown in Table 1.

EXAMPLE 24

The general procedure of Example 1 was repeated except that the polyethylene glycol monomethacrylate of the afore-indicated general formula (C) wherein $R^6$=methyl group, $R^7$=$CH_2CH_2$ and c=4 was replaced by pentaerythritol triacrylate (commercially available under the designation of Aronix M-805 from Toagosei Chem. Ind. Co., Ltd.). The results are shown in Table 1.

EXAMPLE 25

The general procedure of Example 1 was repeated except that the mixture of Example 1 was applied to a plastic lens made of a urethane resin and having a refractive index of 1.594 (lens obtained by thermally polymerizing modified MR-6 monomer available from Mitsui Toatsu Chemicals Inc.) and thermally cured at 120° C. for 1 hour. The resultant lens was substantially inconspicuous with respect to the interference fringe. The mixture was used for evaluation in the same manner as in Example 1. The results are shown in Table 1.

EXAMPLE 26

The general procedure of Example 1 was repeated except that the mixture of Example 1 was applied to a plastic lens, made of a methacrylic resin and having a refractive index of 1.59 (lens obtained by thermally polymerizing TS-26 monomer available from Tokuyama Co., Ltd.) and thermally cured at 120° C. for 1 hour. The resultant lens was substantially inconspicuous with respect to the interference fringe. The mixture was used for evaluation in the same manner as in Example 1. The results are shown in Table 1.

EXAMPLE 27

The general procedure of Example 1 was repeated except that the mixture of Example 1 was applied to a plastic lens, made of a polymer obtained through a urethane reaction and radical polymerization in combination and having a refractive index of 1.59 (lens obtained by thermally polymerizing ML-3 monomer available from Mitsubishi Gas Chemical Co. Inc.) and thermally cured at 120° C. for 1 hour. The resultant lens was substantially inconspicuous of the interference fringe. The mixture was used for evaluation in the same manner as in Example 1. The results are shown in Table 1.

EXAMPLE 28

The general procedure of Example 1 was repeated except that the mixture of Example 1 was applied to a plastic lens, K-25, made primarily of a triazine ring and having a refractive index of 1.60 (available from Kureha Lentech Co. Ltd.) and thermally cured at 120° C. for 1 hour. The resultant lens was substantially inconspicuous of the interference fringe. The mixture was used for evaluation in the same manner as in Example 1. The results are shown in Table 1.

EXAMPLE 29

433 g of Optolake 1130F-2(A-8) was weighed and placed in a flask, to which 120 g of distilled water was added under agitation. 184 g of γ-glycidoxypropyltrimethoxysilane was gradually added to the mixture. After completion of the addition, the mixture was agitated for further 2 hours.

Thereafter, while the mixed dispersion was agitated, 210 g of IPA was added, followed by the further addition of 40 g of Uniox PKA-5001. Then, 3 g of acetylacetone aluminium salt used as a curing catalyst and 0.4 g of PA-57 as a flow control agent were added, followed by agitation for 1 hour. The resultant mixture was aged at room temperature for 48 hours.

The mixture was applied to a plastic lens made of a polyurethane resin and having a refractive index of 1.66 (lens obtained by thermal polymerization of a MR-7 monomer available from Mitsui Toatsu Chemicals Inc.) and thermally cured at 120° C. for 1 hour. The resultant film had a refractive index of 1.64 and the interference fringe of the lens was substantially inconspicuous. The film thickness was 1.5 to 2.0 μm. The mixture was used for evaluation in the same manner as in Example 1. The results are shown in Table 1.

EXAMPLE 30

468 g of Optolake 1130F-2(A-8) was weighed and placed in a flask, to which 120 g of distilled water was added under agitation. 135 g of γ-glycidoxypropyltrimethoxysilane and then 37 g of phenyltrimethoxysilane were gradually added to the mixture. After completion of the addition, the mixture was agitated for 2 hours further.

Thereafter, while the mixed dispersion was agitated, 188 g of ethanol was added, followed by the further addition of 40 g of Blenmor PE400. Then, 15 g of Acetope A1 (MX) used as a curing catalyst and 0.4 g of L-7001 as a flow control agent were added, followed by agitation for 1 hour. The resultant mixture was aged at room temperature for 48 hours.

The mixture was used for evaluation in the same manner as in Example 29. The results are shown in Table 1.

EXAMPLE 31

208 g of Optolake 1130F-2(A-8) was weighed and placed in a flask, to which 120 g of distilled water was added under agitation. 223 g of γ-glycidoxypropyltrimethoxysilane and 80 g of methyltrimethoxysilane were gradually added to the mixture. After completion of the addition, the mixture was agitated for 2 hours further.

Thereafter, while the mixed dispersion was agitated, 315 g of isopropyl alcohol was added, followed by the further addition of 40 g of Blenmor PE200. Then, 3 g of ammonium perchlorate used as a curing catalyst and 0.4 g of L-7001 as a flow control agent were added, followed by agitation for 1 hour. The resultant mixture was aged at room temperature for 48 hours.

The mixture was applied to a plastic lens composed primarily of a diallyl phthalate polymer and having a refractive index of 1.56 and thermally cured at 120° C. for 1 hour. The resultant film was colorless and transparent in appearance. The adherence was found to be 100/100. The cured film had a refractive index of 1.54 and the interference fringe of the lens was substantially inconspicuous. The film thickness was 1.7 to 2.2 μm. The mixture was used for evaluation in the same manner as in Example 1. The results are shown in Table 1.

EXAMPLE 32

The general procedure of Example 1 was repeated except that the mixture of Example 1 was applied to a plastic lens, K-23, made primarily of a triazine ring and having a refractive index of 1.56 (available from Kureha Lentech Co. Ltd.) and thermally cured at 120° C. for 1 hour. The resultant lens was substantially inconspicuous of the interference fringe. The mixture was used for evaluation in the same manner as in Example 1. The results are shown in Table 1.

EXAMPLE 33

The plastic lens substrates obtained in Examples 1 to 32 were each subjected to vacuum deposition to form a reflection inhibiting film consisting of fours layers of $ZrO_2$, $SiO_2$, $ZrO_2$ and $SiO_2$ on the side of the hard coat film. The optical thicknesses of the reflection inhibiting layers being formed were, respectively, about $\gamma/12$, $\gamma/12$, $\gamma/2$ and $\gamma/4$ wherein $\gamma$ is a wavelength of light of 520 nm. The results of evaluation of the resultant lens are shown in Table 2.

COMPARATIVE EXAMPLE 1

275 g of γ-glycidoxypropyltrimethoxysilane was weighed and placed in a flask. While keeping the temperature of the liquid at 10° C. or below under agitation, 63 g of 0.01N hydrochloric acid aqueous solution was gradually added thereby permitting γ-glycidoxypropyltrimethoxysilane to be hydrolyzed. Subsequently, 298 g of methanol was added to the solution, followed by further agitation for 1 hour. 350 g of Optolake 1130F-2(A-8) was added to the solution. After completion of the addition, agitation was continued for 1 hour further. Moreover, 3 g of ammonium perchlorate used as a curing catalyst and 0.4 g of L-7001 as a flow control agent were added to the mixture and agitated for 1 hour. The mixture was aged at room temperature for 24 hours.

The mixture was used for evaluation in the same manner as in Example 1. The results are shown in Table 1.

COMPARATIVE EXAMPLE 2

The general procedure of Comparative Example 1 was repeated using, instead of the sol of the composite metal oxide consisting of $TiO_2$—$Fe_2O_3$—$SiO_2$ of Comparative Example 1, a sol of a composite metal oxide consisting of $TiO_2$—$CeO_2$—$SiO_2$. The results are shown in Table 1.

COMPARATIVE EXAMPLE 3

The general procedure of Comparative Example 1 was repeated using, instead of the sol of the composite metal oxide consisting of $TiO_2$—$Fe_2O_3$—$SiO_2$ of Comparative Example 1, a sol of a metal oxide consisting of $Sb_2O_5$. The results are shown in Table 1.

COMPARATIVE EXAMPLE 4

300 g of colloidal silica (an aqueous dispersion sol having a solid content of 30% commercially available under the designation of Snowtex O-40 from Nissan Chemical Industries, Ltd.) was weighed and placed in a flask. While cooling under agitation, 204 g of γ-glycidoxypropyltrimethoxysilane was gradually added to the sol. After completion of the addition, the agitation was continued for 1 hour further. During the course of the agitation, the cooling was stopped at the time when the mixture was not raised in temperature.

Thereafter, while agitating the mixture, 451 g of isopropanol was added, followed by the further addition of 38 g of PE90. Further, 1.5 g of ammonium perchlorate and 0.4 g of L-7001 used as a flow control agent were added to the mixture, followed by agitation for 1 hour. The mixture was aged at room temperature for 24 hours.

The mixture was evaluated in the same manner as in Example 1. The results are shown in Table 1.

The coating compositions of the examples and comparative examples were, respectively, coated in the following manner.

(1) A lens substrate was immersed in a 8% NaOH aqueous solution for 30 minutes, rinsed sufficiently with water and dried.

(2) The substrate was dipped in the respective coating compositions at a removal speed of 15 cm/minute.

(3) The coated substrate was dried at room temperature for about 5 minutes and thermally cured at 120° C. for 1 hour.

The films obtained in the examples and comparative examples were tested according to the following methods.

(1) Cross hatch test (prescribed in JIS K5400)

(2) Steel wool test

Steel wool #0000 was used, with which each film was rubbed under a load of 1 kg weight to evaluate a degree of scratching according to the following standards.

5: not scratched at all, 4: scratched to a slight degree

3: scratched to a degree 2: scratched to a substantial degree

1: scratched to the substrate (3) Dyeability

BIP Gray commercially sold by Brain Powder Inc. of U.S.A. was diluted with distilled water to 9% and heated to 90° C. The lenses which had been applied with the respective coating compositions were each immersed in the aqueous solution for 5 minutes, followed by removal of the lenses and rinsing with water. The thus dyed lenses were subjected to measurement of all light transmittance to compare dyeabilities with each other.

(4) Interference fringe

A single-color lamp, UNILAMP, of Midwest Scientific Co. of U.S.A. was used to visually observe interference fringes of the coated lenses.

(5) Accelerated weathering test

The weatherbility of coated lenses was evaluated with Xenon Arc weather or meter. In addition, this test was conducted at a black panel temperature of 68°±3° C., and at a water spraying cycle of 16 minutes/2hours. The results of the cross hatch test and of apperance after exposing the lenses for 248 hrs. are shown in Table 2.

TABLE 1

Results of Evaluation of Hard Coat Lenses

| Example | Appearance | Adherence | SW Hardness | Dyeability | Interference Fringe |
|---|---|---|---|---|---|
| 1 | good | 100/100 | 4 | 32% | no |
| 2 | good | 100/100 | 4 | 35 | no |
| 3 | good | 100/100 | 4 | 40 | no |
| 4 | good | 100/100 | 4 | 41 | no |
| 5 | good | 100/100 | 4 | 36 | no |
| 6 | good | 100/100 | 4 | 11 | slightly observed |
| 7 | good | 100/100 | 4 | 26 | no |
| 8 | good | 100/100 | 4 | 34 | no |
| 9 | good | 100/100 | 5 | 60 | slightly observed |
| 10 | good | 100/100 | 4 | 31 | no |
| 11 | good | 100/100 | 4 | 50 | no |

TABLE 1-continued

Results of Evaluation of Hard Coat Lenses

|  |  | Appearance | Adherence | SW Hardness | Dyeability | Interference Fringe |
|---|---|---|---|---|---|---|
|  | 12 | good | 100/100 | 4 | 40 | no |
|  | 13 | good | 100/100 | 3 | 28 | no |
|  | 14 | good | 100/100 | 4 | 32 | no |
|  | 15 | good | 100/100 | 5 | 62 | no |
|  | 16 | good | 100/100 | 4 | 30 | no |
|  | 17 | good | 100/100 | 4 | 25 | no |
|  | 18 | good | 100/100 | 4 | 48 | no |
|  | 19 | good | 100/100 | 4 | 28 | no |
|  | 20 | good | 100/100 | 4 | 45 | no |
|  | 21 | good | 100/100 | 4 | 30 | no |
|  | 22 | good | 100/100 | 4 | 40 | no |
|  | 23 | good | 100/100 | 4 | 41 | no |
|  | 24 | good | 100/100 | 4 | 41 | no |
|  | 25 | good | 100/100 | 4 | 36 | no |
|  | 26 | good | 100/100 | 4 | 38 | no |
|  | 27 | good | 100/100 | 4 | 40 | no |
|  | 28 | good | 100/100 | 4 | 41 | no |
|  | 29 | good | 100/100 | 4 | 33 | no |
|  | 30 | good | 100/100 | 4 | 34 | no |
|  | 31 | good | 100/100 | 4 | 39 | no |
|  | 32 | good | 100/100 | 4 | 42 | no |
| Comparative Example | 1 | good | 100/100 | 4 | 89% | no |
|  | 2 | good | 100/100 | 4 | 89 | no |
|  | 3 | good | 100/100 | 4 | 89 | no |
|  | 4 | good | 100/100 | 4 | 32 | yes |

TABLE 2

Results of Evaluation of Reflection Inhibiting Film-bearing Lenses

|  |  | Initial Performance | | | After Weather Resistance Test | |
|---|---|---|---|---|---|---|
|  |  | Appearance | Adherence | SW Hardness | Appearance | Adherence |
| Example | 1 | good | 100/100 | 5 | good | 100/100 |
|  | 2 | good | 100/100 | 5 | good | 100/100 |
|  | 3 | good | 100/100 | 5 | good | 100/100 |
|  | 4 | good | 100/100 | 5 | good | 100/100 |
|  | 5 | good | 100/100 | 5 | good | 100/100 |
|  | 6 | good | 100/100 | 5 | good | 100/100 |
|  | 7 | good | 100/100 | 5 | good | 100/100 |
|  | 8 | good | 100/100 | 5 | good | 100/100 |
|  | 9 | good | 100/100 | 5 | good | 100/100 |
|  | 10 | good | 100/100 | 5 | good | 100/100 |
|  | 11 | good | 100/100 | 5 | good | 100/100 |
|  | 12 | good | 100/100 | 5 | good | 100/100 |
|  | 13 | good | 100/100 | 5 | good | 100/100 |
|  | 14 | good | 100/100 | 5 | good | 100/100 |
|  | 15 | good | 100/100 | 5 | good | 100/100 |
|  | 16 | good | 100/100 | 5 | good | 100/100 |
|  | 17 | good | 100/100 | 5 | good | 100/100 |
|  | 18 | good | 100/100 | 5 | good | 100/100 |
|  | 19 | good | 100/100 | 5 | good | 100/100 |
|  | 20 | good | 100/100 | 5 | good | 100/100 |
|  | 21 | good | 100/100 | 5 | good | 100/100 |
|  | 22 | good | 100/100 | 5 | good | 100/100 |
|  | 23 | good | 100/100 | 5 | good | 100/100 |
|  | 24 | good | 100/100 | 5 | good | 100/100 |
|  | 25 | good | 100/100 | 5 | good | 100/100 |
|  | 26 | good | 100/100 | 5 | good | 100/100 |
|  | 27 | good | 100/100 | 5 | good | 100/100 |
|  | 28 | good | 100/100 | 5 | good | 100/100 |
|  | 29 | good | 100/100 | 5 | good | 100/100 |
|  | 30 | good | 100/100 | 5 | good | 100/100 |
|  | 31 | good | 100/100 | 5 | good | 100/100 |
|  | 32 | good | 100/100 | 5 | good | 100/100 |

As will be apparent from the results of Tables 1 and 2, the coating compositions of Comparative Examples 1 to 3, wherein the third component used in the present invention is not contained at all, is substantially impossible to dye after curing. With the case of Comparative Example 4, the resultant hard coating layer is low in refractive index and has interference fringes. On the other hand, the films obtained from the coating compositions of the invention are free of any interference fringe and can be deep dyed.

What is claimed is:

1. A coated article comprising an optically transparent substrate having a refractive index of not lower than 1.50 and a cured film having a refractive index of between 1.48 and 1.70 on said substrate, said cured film being formed from a coating composition comprising:

(1) particles of at least one oxide selected from the group consisting of silica, iron oxide, titanium oxide, cerium oxide, zirconium oxide, antimony oxide, zinc oxide and tin oxide, and composite oxides thereof, said particles having an average particle size of from 1 to 100 nm;

(2) an epoxy group-containing silicon compound or a partial hydrolyzate thereof; and (3) an organic compound having the formula $R^4$—X—$R^5$YH, wherein $R^4$ represents a monovalent hydrocarbon group having at least one unsaturated group, $R^5$ represents a divalent hydrocarbon group having 2 or more carbon atoms and contains an oxygen atom or a sulfur atom, X represents —O—, —CO—O—, —S—, —CO—S— and —CS—S—, and Y represents an oxygen atom or a sulfur atom; and (4) a curing catalyst for said epoxy group-containing silicon compound, wherein said composition comprises from 10 to 70 wt. % of said particles, from 5 to 90 wt. % of said epoxy group-containing silicon compound and 1 to 45 wt. % of said organic compound, based on the total solids in said composition.

2. A coated article according to claim 1, further comprising a reflection inhibiting film formed on said cured film and made of an inorganic compound.

3. A coated article according to claim 1, wherein $R^4$ contains an oxygen atom or a sulfur atom.

4. A coated article comprising an optically transparent substrate having a refractive index not lower than 1.50 and a cured film on said substrate, said cured film being formed from a coating composition comprising:

(1) particles selected from the group consisting of composite metal oxides of titanium oxide-iron oxide-silica and titanium oxide-cerium oxide-silica, said particles having an average particle size of from 1 to 100 nm;

(2) an epoxy group-containing silicon compound or a partial hydrolyzate thereof; and (3) an organic compound having one OH group or SH group in its molecule and containing in a main chain thereof at least one bonding unit selected from the group Consisting of —O—, —CO—O—, —S—, —CO—S— and —CS—S—, along with at least one unsaturated group, the organic compound being soluble in water or a lower alcohol having up to 4 carbon atoms; and (4) a curing catalyst for said epoxy group-containing silicon compound;

wherein said composition comprises from 10 to 70 wt. % of said particles, from 5 to 90 wt. % of said epoxy group-containing silicon compound and 1 to 45 wt. % of said organic compound, based on the total solids in said composition.

5. A coated article according to claim 4, further comprising a reflection inhibiting film formed on the cured film and made of an inorganic compound.

* * * * *